United States Patent [19]

Hashimoto

[11] 4,242,539
[45] Dec. 30, 1980

[54] TELEPHONE INFORMATION DISPLAYING DEVICE

[75] Inventor: Kazuo Hashimoto, Tokyo, Japan

[73] Assignee: Hashimoto Corporation Kabushiki Kaisha, Tokyo, Japan

[21] Appl. No.: 28,511

[22] Filed: Apr. 9, 1979

Related U.S. Application Data

[63] Continuation-in-part of Ser. No. 794,625, May 6, 1977, abandoned.

[30] Foreign Application Priority Data

May 8, 1976 [JP] Japan .................. 51-52435

[51] Int. Cl.³ .................... H04M 15/06
[52] U.S. Cl. .................... 179/5.5; 179/6 R
[58] Field of Search .......... 179/5.5, 18 FH, 27 DB, 179/6 R, 6 E, 81 R, 90 K

[56] References Cited

U.S. PATENT DOCUMENTS

| | | | |
|---|---|---|---|
| 3,324,245 | 6/1967 | Stenhammar | 179/5.5 |
| 3,600,517 | 8/1971 | Goodman | 179/5.5 |
| 3,686,440 | 8/1972 | Kroeger | 179/5.5 |
| 3,727,003 | 4/1973 | Paraskevakos | 179/5.5 |
| 3,787,626 | 1/1974 | Subieta | 179/5.5 |

*Primary Examiner*—Raymond F. Cardillo, Jr.
*Assistant Examiner*—Joseph A. Popek
*Attorney, Agent, or Firm*—Haseltine, Lake & Waters

[57] ABSTRACT

A calling party's telephone number displaying device in which, while the telephone set of a subscriber is ringing in response to calling signals from a telephone exchange office, the telephone number of a calling party and information are displayed on digital display units at high speed before lifting the handset. Accordingly, the subscriber can determine whether or not he should answer the call before picking up the handset. Thus, his privacy can be protected from a variety of telephone troubles such as wrong number and nuisance calls. The display is maintained as it is even if the handset is put back after the talk but it will be cleared automatically upon reception of the next call to display the telephone number of the next calling party. When the subscriber picks up the handset to make a call, the internal circuit is automatically changed to display a telephone number dialed by him.

12 Claims, 3 Drawing Figures

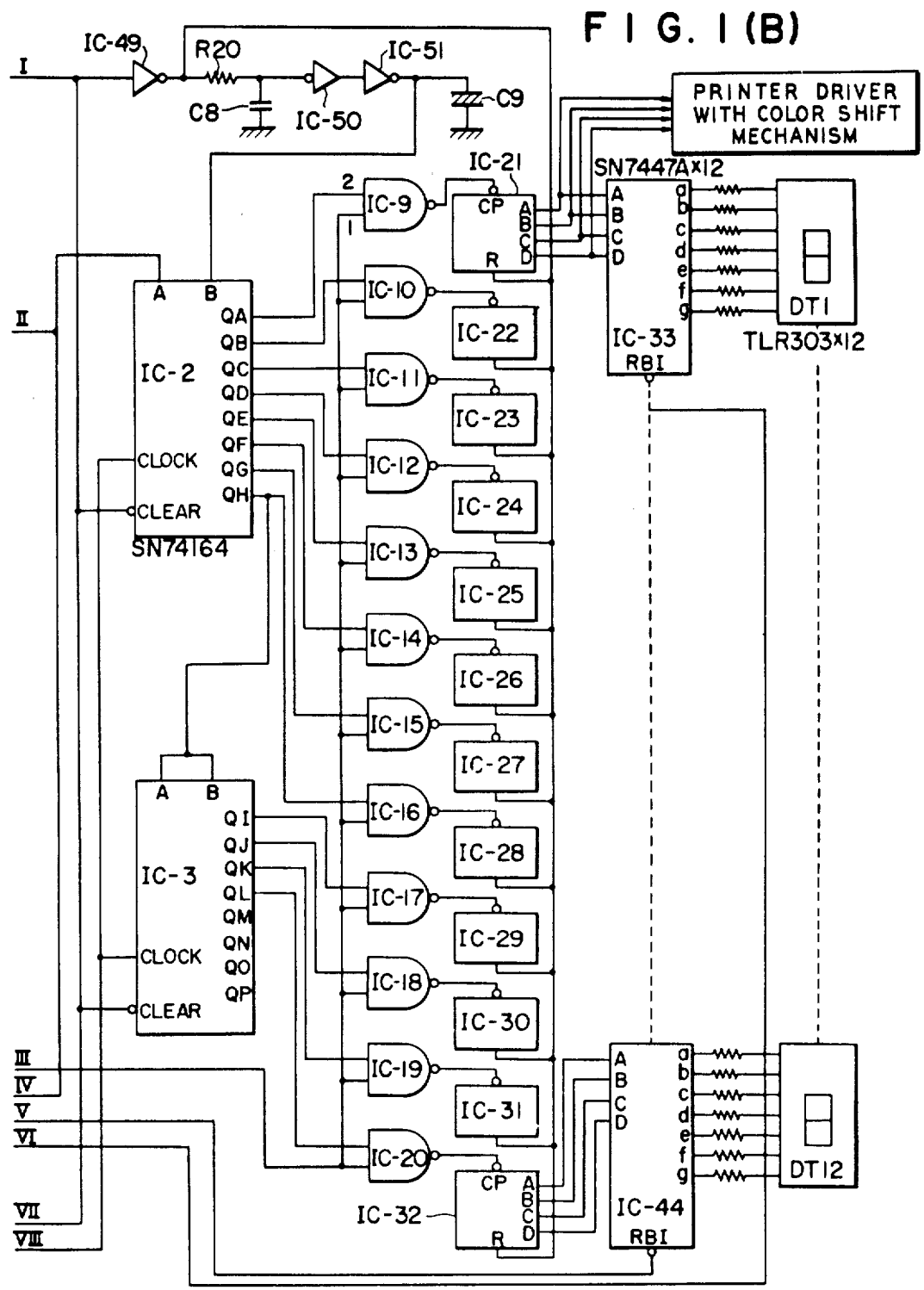
FIG. I(B)

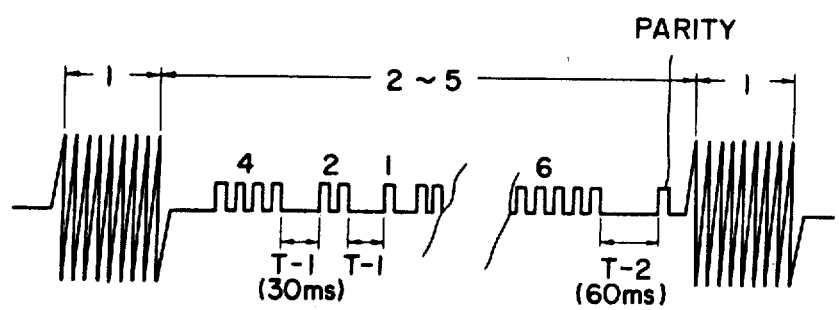

TELEPHONE INFORMATION DISPLAYING DEVICE

CROSS REFERENCES TO RELATED APPLICATIONS

This Application is a continuation-in-part of Application Ser. No. 794,625, filed May 6, 1977 now abandoned. In the prosecution of said Application the following prior art of which Applicant is aware was listed and discussed:
A. German Patent No. 2,538,820
B. Japanese Utility Model-Publication No. 15,137/1977 KOKAI No. 95807/1974
C. Japanese Utility Model-Publication No. 49423/1976 KOKAI No. 124302/1976

BACKGROUND OF THE INVENTION

This invention relates to telephone number information displaying devices in which, while the bell of a telephone set is ringing, the telephone number of a calling party is displayed at high speed.

A variety of techniques have been developed as means in which, while a called party is talking with a calling party after the latter dialed and the former picks us the handset the telephone exchange performs counter detection for the telephone number of the calling party upon the called party's request. Furthermore, there are some subscriber-owned systems in which the calling party's number can be transmitted to the called party side by the devices provided on both sides after the talk condition has been established.

However, these conventional devices are basically different in technical concept from this invention. Primarily, the invention has been developed for protecting the privacy of a subscriber; that is, the invention has been developed for eliminating drawbacks inherent to the present telephone communication system. In the invention, while the bell of the telephone set is ringing, the dial information of the calling party is displayed at high speed (within one second). The Applicant has a Japanese Patent on this subject. However, it is in its early stage, and it is not so practical for other than use in a PBX (private branch exchange) in the present telephone exchange system as its dial information transmitting speed is very slow.

With respect to the above-described conventional device, a technique in which, when the user dials a telephone number, the telephone number is displayed on the device so that he may not make a mistake in dialing it, has been developed already. In the displaying device according to the invention, this effect is obtained by switching necessary or selected circuits with a greater part of the device maintained as it is. More specifically, the circuit for this purpose is so designed that if the user picks up the handset to dial, the necessary switching operation is automatically achieved.

SUMMARY OF THE INVENTION

A first object of this invention is to display the telephone number of a calling party on a telephone set or an auxiliary digital display unit thereof immediately when a calling signal is delivered from the telephone exchange of a subscriber.

A second object of the invention is to provide a device in which even if the telephone number information of a calling party is delivered from the telephone exchange of a called party immediately before the calling signals, or between the calling signals, or by superimposing it on the calling signal, it can be detected and displayed.

A third object of the invention resides in that when a subscriber dials the telephone number of another subscriber, the internal circuit is changed merely by lifting the handset, and the telephone number dialed at slow speed is displayed on the same display unit.

A fourth object of the invention is to provide a displaying device in which an electronic printer is provided in parallel with display units, so that telephone numbers of calls received during the user's absence can be recorded and acknowledged, and which can be used in combination with an automatic telephone answering device.

According to this invention, when a calling party calls a called party, the telephone number of the called party dialed by the calling party and the telephone number of the calling party stored, in advance, in the telephone exchange of the calling party are sequentially transmitted to the telephone exchange of the called party; the telephone exchange of the called party transmits the telephone number information of the calling party at high speed by wire or wireless means to the device on the side of the called party; and the device on the side of the called party, upon reception of the information, translates it into the telephone number, which is displayed with light emitting diodes or the like, whereby before lifting the handset the called party can determine who the calling party is. The thus displayed telephone number is maintained as it is until the next call is received even if the called party replaces the handset on the telephone set. However, the display of the telephone number can be turned off by operating manual means. In addition, the device of the present invention can be employed also as a means for displaying a telephone number which is dialed by the user when he makes a telephone call.

The telephone set may be of the rotary-dial type or the push button type. In the displaying device of the invention, it is possible that the telephone number of a calling party delivered from the telephone exchange of the calling party is allowed to be transmitted to the called party only when it is confirmed that the called party is a subscriber of this type service. Furthermore, in the device of the invention it is also possible that, when a condition that calling signals can be transmitted is obtained, the transmission of calling signals is retained temporarily so that the dial information is transmitted between the calling signals. In addition, in the case where the user with the device of the invention makes a call, if he merely picks up the handset, its internal circuit is changed so as to display a telephone number which is dialed by him at low speed (manually).

As is well known in the art, and by way of example, in U.S. Pat. No. 3,727,003 in the so-called step-by-step system, the telephone number of a called party transmitted by a calling party are successively transmitted from the first selector to the next selector to finally find out the telephone office of the called party. In this case, the telephone number of the calling party is transmitted simultaneously or with a pre-determined time lag with the telephone number of the called party transmitted by the calling party. Also it goes without saying that a signal train is not broken for each step through the period, but is continuously held to the last. On the other hand, in the common controlled exchange system, the telephone number of a called party is transmitted to the exchange in a called office or switching office by the sender of the exchange in a calling office wherein the telephone number of the called party is connected to the end unit of the called party. In order to add the transmitting function of the telephone number of a calling party to the sender, it is necessary to provide digit stepping circuits for a calling party and for a called party, respectively or to provide common means for time-dividing in utilizing the circuits. For this reason, information which has been memorized in advance, in a magnetic core, etc. is read out and is transmitted to the telephone office of a called party by the digit stepping circuits, etc. Then, the dial information which has been memorized in a buffer register is rapidly and automatically transmitted between the calling signals in accordance with the service class of a called party subscriber.

The foregoing objects, other object, specific features and effects of this invention will become more apparent from the following detailed description and appended claims when read in conjunction with the accompanying drawings.

BRIEF DESCRIPTION OF THE DRAWINGS

In the accompanying drawings:

FIGS. 1(A) and 1(B) are two parts of a schematic diagram showing one example of a calling party's telephone number displaying device according to the invention provided on the side of a called party; and FIG. 2 is a waveform diagram showing relationships between calling signals and the telephone number of a calling party transmitted by a telephone exchange.

DETAILED DESCRIPTION OF THE INVENTION

Figure 1A:
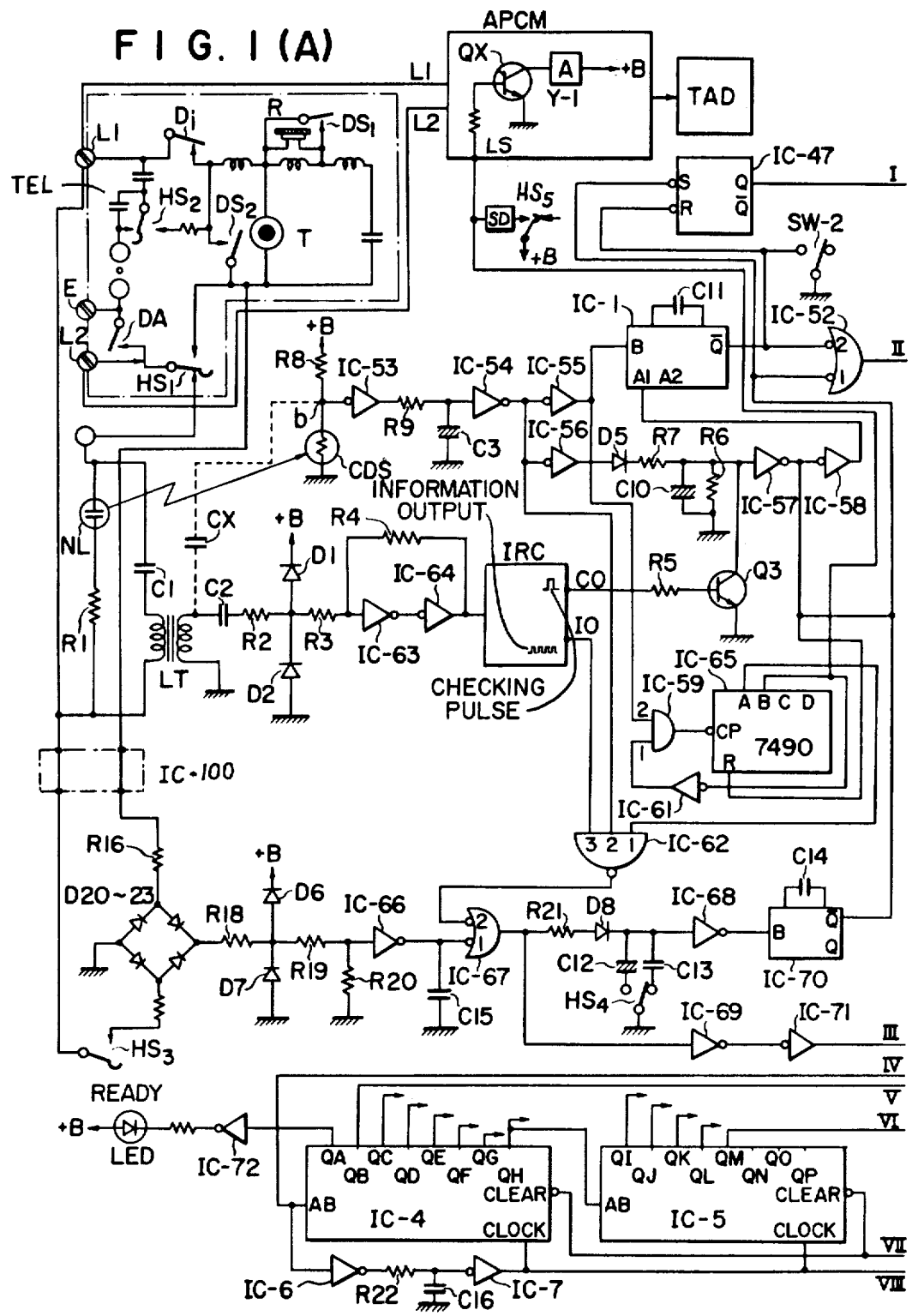

One preferred embodiment of a device for displaying the telephone number of a calling party according to this invention is shown in FIG. 1, which comprises, in combination, capacitors C1, C2 ---, resistors R1, R2 ---, diodes D1, D2 ---, telephone lines L1 and L2, a called party's telephone set TEL, a line transformer LT, a neon lamp NL, monostable multivibrator circuits IC-1 and IC-70, and parallel-output type 8-bit shift registers IC-2 through IC-5 each of which is, for instance, type SN 74164.

The circuit shown in FIG. 1 further comprises: a clock pulse generating circuit including two inverters IC-6 and IC-7, 2-input NAND circuits IC-9 through IC-20, and decade counters IC-21 through IC-32 each of which is SN-7490 in this example. These decade counters serve to count dial numerals in dial information (described later). The same thing can be said of reference numeral IC-65. Furthermore, reference numerals IC-35 through IC-44 designate BCD 7-segment decoder/drivers (SN7446) which receive the outputs of the decimal counters to operate light emission diode digital display units DT1 through DT12 (LED or LCD). In addition, as is seen in FIG. 1, a number of NAND gates, inverters, etc. are employed (described later).

In this specification, the terms "a high level" and "a low level" to designate the levels of outputs or inputs of various circuit elements are indicated by "HI" and "LO", respectively, when applicable.

Upon arrival of the first calling signal (of 20 Hz), the neon lamp NL (which may be a light emission diode) is turned on. By receiving the light beam from the neon lamp NL, a photoelectric element CdS reduces its resistance. As a result, the input of the inverter IC-53 is LO, and output of the inverter IC-53 is HI, and therefore the capacitor C3 is charged. Thereafter, the output of the inverter IC-55 is raised to HI, and the monostable multivibrator IC-1 is triggered to produce a single negative pulse through its output terminal $\overline{Q}$. This single pulse, as described later, is applied to the reset terminal R of an R-S flip-flop circuit IC-47 to reset the same. As a result, the output Q is LO whereby all of the shift registers IC-2 through IC-5 are cleared. At the same time, the output level of the inverter IC-49 is HI, whereby all of the decimal counters IC-21 through IC-32 are cleared, and digits displayed on the display units DT-1 through DT-12 are cleared, if any, so that the display units become ready for the next display. In this operation the terminal B of the shift register IC-2 is HI through the inverters IC-49, IC-50 and IC-51 (which will be described later).

For the period of time during which the bell is ringing, the output of the inverter IC-53 is HI and the output of the inverter IC-54 is LO. Therefore, the input of the inverter IC-56 is LO and its output is HI. This HI is applied to the imput of the inverter IC-57 with a time delay caused by a delay circuit with the resistor R7 and the capacitor C10, and the output of the inverter IC-57 is LO. This LO is applied to the set terminal S of the above-described flip-flop circuit IC-47 to set the same, and to the reset terminal R of the decimal counter IC-65 to reset the same (which will be described later). Accordingly, the level of the output terminal Q of the R-S flip-flop IC-47 is raised to HI. In other words, when the first ringing is carried out, the R-S flip-flop is first reset, and is soon set to be ready for allowing the dial information (described later), which is applied after completion of the first ringing, to be displayed on the display units DT-1 through DT-12.

When the level of the output Q of the R-S flip-flop is raised to HI, the input of the inverter IC-49 is raised to HI, and the output is LO. In approximately 0.5 msec, the input of the inverter IC-50 is lowered to LO, the output is raised to HI, and the output of the inverter IC-51 is LO. As a result, the level of the terminal B of the shift register IC-2 is lowered to LO from HI (which will be described later).

When the output level of the inverter IC-49 is LO, the levels of the terminals R of the decade counters IC-21-IC-32 are changed to LO from the initial HI to be ready for the counting operation (described later).

As the input of the inverter IC-49, as was described, is HI, the levels of the CLEAR terminals of the shift registers IC-2 - IC-5 are raised to HI, and the clear states of the shift registers IC-2 - IC-5 are released.

As was described, upon the first ringing, the single negative pulse is produced through the terminal $\overline{Q}$ of the monostable multivibrator IC-1. As a result, the level of the input terminal 2 of the 2-imput NOR circuit IC-52 is LO, and its output is HI. This HI is applied to the terminal A of the shift register IC-2 and to the terminal AB of the shift register IC-4. As a result, the levels of the CLOCK terminals of the shift registers IC-2 - IC-5 are raised to HI through the clock pulse generating circuit comprising the inverter IC-6, a delay circuit including the register R22 and the capacitor C16, and the inverter IC-7 within 0.5 msec after the level of the output Q of the R-S flip-flop IC-47, as was described, has been raised to HI; the level of the terminal B of the shift register IC-2 is maintained at HI, because the output level of the inverter IC-51 is lowered to LO after it has passed the time constant (about 0.5 msec) of the delay circuit R20 and C8. Accordingly, when the levels of the CLOCK terminals of the shift registers IC-2 - IC-5, as was described, are raised to HI within the 0.5 msec, HI of the terminals A and B are inputted to the shift registers, and the level of the first bit QA (in each of the shift registers IC-2 and IC-4) becomes HI. Thus, the first shifting operation is carried out.

The fact that the input conditions of the shift registers IC-2 and IC-4 are as shown in the figure will be described.

In each of the shift registers IC-2 and IC-3, its output level is raised to HI bit by bit whenever it carries out its shift through the NOR gate IC-52, with the aid of the single pulse which is produced by the monostable multivibrator IC-70 whenever a minimum pause occurs in the dial information as will be described later. The input condition for that shift is that the levels at the terminals A and B are inputted to the register at the time instant when the level of the clock signal is changed to HI from LO while the terminals A and B are HI. Therefore, in the shift register IC-2, the levels of the outputs QA through QH are raised to HI sequentially. For instance, when the output QB is LO, the level of the output QC is raised to and held at HI.

On the other hand, in each of the shift registers IC-4 and IC-5, an input is applied to the terminal AB thereof whenever the clock pulse is generated. More specifically, the number of bits whose levels are raised to HI is increased as the clock pulses are produced. In other words, in the shift registers IC-4 and IC-5, the outputs are raised to HI by overlapping the bits one by one. Therefore, if in the shift registers IC-4, the first bit QA is HI as described above, an additionally provided light emission diode LED emits light to display a word "READY", which means that preparation for receiving the dial information, or displaying the counts, is "ready". The operations effected while the bell is ringing, are as described above.

Now, the state of the AND gate IC-59 obtained when the first ringing is ended, will be described. The input terminal 2 of the AND gate IC-59, or the output of the inverter IC-55, is HI while the bell is ringing; however, when the ringing is ended, the HI output is lowered to LO, and the output of the AND gate IC-59 is LO. Therefore, the decimal counter 7490 IC-65 counts one. As a result, the level of the terminal A of the decimal counter IC-65 is raised to HI from LO. Therefore the level of the input terminal 1 of the NAND gate IC-62 is raised to HI. The level of the input terminal 2 of the NAND gate IC-62 is raised to HI because the level of the output of the inverter IC-54 is at HI when the ringing is suspended. The input terminal 3 of the NAND gate IC-62 has LO or HI according to the content of the dial information (described later). In other words, when the dial information output (described later) at HI is produced through the terminal shown in the figure, all of the inputs of the NAND gate IC-62 are HI, and therefore its output level is LO. Since the level of the input terminal 1 of the NOR gate IC-67 is kept at LO at all times, if its input terminal, as was described, has LO, its output is at HI.

Now, the case where dial information as shown in FIG. 2 is applied to the device from a telephone exchange, will be described.

In the case when the dial information, 421-2266, of a calling party has arrived, the first digit "4" is represented by the first train of pulses, which are applied to the secondary side of the line transformer LT, and are then shaped by a Schmitt trigger circuit IC-63 and IC-64. The train of pulses thus treated are inputted to an information receiving circuit IRC and are delivered, as pulses whose level alters between the HI and LO, through a dial information output terminal IO of the circuit IRC, to the input terminal 3 of the NAND gate IC-62. If this input terminal 3 is HI, all of the input terminals 1,2,3 of the NAND gate IC-62 are HI, and its output is LO. As a result, the output of the NOR gate IC-67 is HI, and the charging of the capacitor C13 is started.

Soon, the input level of the inverter IC-68 is raised to HI, and its output level is lowered to LO. Therefore, the monostable multivibrator IC-70 is not triggered and the shifting operation described before is not carried out (described later). As the output of the NOR gate IC-67 is HI level, the output level of the inverter IC-69 is LO. This LO is applied through the inverter IC-71 to a common gate input terminal 1 is of the NAND gates IC-9 - IC-20 to raise the level of the common gate input terminal 1 to HI. In this case, as the input terminal 2 of the NAND gate IC-9, as was described, has been raised to HI by the output QA of the shift register IC-2, the intermittent signals of the dial information, for instance four pulses of HI and LO appear as four outputs at the HI and LO at the output of the NOR gate IC-9. The decade counter IC-21, counting one whenever its input level is changed to LO from HI, counts up to four. Thus, "4" is displayed on the light emitting diode display unit DT-1 through the decoder IC-33. In other words, when the telephone number output terminal IO is HI, the input of the decimal counter is LO, and one is counted. This is repeated four times, and the count "4" is displayed.

In this case, as was described, HI and LO are repeatedly applied to the input terminal 2 of the NOR gate IC-67. On the other hand, the capacitor C13 is charged and its voltage is maintained by the diode D8. Therefore even if the output of the NOR gate IC-67 is lowered to LO, the capacitor C13 is not discharged for the period of time during which dial pulses, or the four pulses, are produced. Accordingly, the output of the inventer IC-68 is at LO, and no single pulse is produced by the monostable multivibrator IC-70.

When the first digit "4", as was described, is displayed, the telephone number comes to a minimum pause. At this moment, the signal level is at approximately zero volt. The period of this minimum pause is determined about 30 msec in this embodiment. The capacitance of the capacitor C13 is determined so as to match the period of the minimum pause.

As is apparent from the above description also, when the charging of the capacitor C13 is suspended during the minimum pause, the capacitor C13 is discharged through the inverter IC-68, as a result of which within about 30 msec the input level of the inverter IC-68 is lowered to LO, while its output level is raised to HI. Therefore, the monostable multivibrator IC-70 is triggered to produce a single negative pulse at its output terminal $\overline{Q}$. Thus, the low level is applied to the input terminal 1 of the NOR gate IC-52, the output level of which is raised to HI. Thus, similarly as in the above-described case, the level of the terminal A of the shift register IC-2 and the level of the terminal AB of the shift register IC-4 are both raised to HI, while a clock pulse is produced to shift the shift registers by one bit. As a result, as was described before, the level of the terminal A of the shift register IC-2 has been raised to HI and the level of the terminal QA has been raised to HI by the single negative pulse provided at the terminal of the monostable multivibrator IC-1 during the first ringing. But, by the one-bit shift the levels of the terminals QA and QB are changed to LO and HI, respectively. On the other hand, as was described before, the levels of the terminals QA and QB of the shift register IC-4 are raised to HI. Thus, the output of the terminal QB of the shift register IC-4 serves to raise to the HI level the level of the ripple blanking input terminal RBI of the decoder IC-33 provided for displaying the first digit in the telephone number.

If the terminal RBI of the decoder IC-33 is LO, the decoder IC-33 will not operate to display "0". But, in the telephone number, "0" means "10". In order to avoid this confusion, the zero suppression for inhibiting the display of the light emission diode display unit which ordinarily can display "0", is carried out by lowering the level of the terminal RBI to LO. However, in the case when the dialed number is "0" even if the concerned one of the decimal counters IC-21 - IC-32 counts "10", it is processed as "0". Therefore, it is so designed that in the case of dialing "0", the "0" is not displayed without raising the level of the terminal RBI to HI. The raising of the level of the terminal RBI is carried out at the time when the shift registers IC-4 and IC-5 are shifted during the minimum pause succeeding the information of the first digit in the dial information. In other words, in the case where the dialed digit is "0", the "0" is displayed through the following steps: the telephone number comes to the minimum pause, the single pulse is produced by the monostable multivibrator IC-70, the output level of the NOR gate IC-52 is raised to HI, the clock pulse is produced, and finally the "0" is displayed by the light emitting diode display unit. Therefore, the display of "0" is delayed by one step when compared with those of the other digits. However, as a whole, not only the digit "0" but also the other digits can be correctly displayed.

The digits in the telephone numbers are inputted successively in a manner such as was described, they are displayed on the display units successively starting from the first digit to the right. In this example, as two 8-bit shift registers are series-connected, the dial information up to fifteen digits can be displayed.

It is predetermined in advance that when the last digit has been displayed, a signal representative of whether the dial information is correct or erroneous is sent from the telephone exchange. In general, in the error check, out of the 7 bits of information, the first 6 bits represent numerals, and the seventh bit is used as a signal for parity check. In this example, the information on the side of the calling party is once stored in a buffer register or the like in the telephone exchange on the side of the called party, and is then transmitted. In this operation, if the transmitted information is erroneous, the correct information is introduced by the parity check between the telephone exchanges, and it is stored in a buffer register or the like. Accordingly, if, when the telephone exchange on the side of the called part sends the information to the called party, it is possible, when the information has been sent to the called party, to detect whether or not the sent information is correct. For this reason, in this example, the minimum pause occurs after the completion of the necessary dial information, and thereafter a single pulse having a particular frequency is delivered. It goes without saying that it is preferable that the single pulse is a pulse that has been subjected to frequency-modulation, so as to prevent a malfunction.

Assuming that, in this example, when the information is not correct, a single pulse is sent, and when the information is correct, no single pulse is sent, the present invention will be further described.

In the case when the digits in the dial information displayed on the display units are correct, the charged capacitor C10 is kept at HI for at least several seconds by the delay circuit comprising the capacitor C10 and the resistor R7, as was described before. Therefore, the output level of the inverter IC-57 is lowered to LO, while the output level of the inverter IC-58 is raised to HI, as a result of which the level of the terminal A1A2 of the monostable multivibrator IC-1 is raised to HI to make the monostable multivibrator IC-1 inoperable. This is to assure that the display is maintained as it is no matter how many times the bell rings thereafter.

On the other hand in the case where the dial information is not correct, the party signal is outputted, as a positive pulse, through a checking output terminal CO of the information receiving circuit IRC. As a result, the transistor Q3 is rendered conductive, the input of the inverter IC-57 is LO and its output is HI while the output of the inverter IC-58 is LO. Accordingly, the level of the terminal A1A2 of the monostable multivibrator IC-1 is lowered to LO to set the same IC-1. Therefore, the monostable multivibrator IC-1 is in a state that when the next ringing is started, it is triggered to reset the R-S flip-flop circuit, as was described before. In other words, when the second ringing is carried out, the input level of the inverter IC-53 is LO, the output is HI, the output of the inverter IC-54 is LO, and the output of the inverter IC-55 is changed to HI. Accordingly, the level of the input B of the monostable multivibrator IC-1 is changed from the LO level to the HI level, as a result of which the monostable multivibrator IC-1 is triggered and the level of the output terminal Q thereof is lowered to LO. As a result, the R-S flip-flop circuit is reset again, and the above-described displayed digits are cleared at the same time. After this clearing, the input level of the inverter IC-57 is raised to the HI level with a short time delay owing to its resistor R7 and capacitor C10, and its output level is lowered to LO. As a result, the level of the set terminal of the flip-flop circuit IC-47 is lowered to LO to set the flip-flop circuit IC-47 and to raise the level of the terminal Q to HI.

Under this condition, upon arrival of the next dial information, the digits thereof are displayed on the display unit while being shifted, as was described before.

Upon completion of displaying the digits, if the telephone number is correct, no checking pulse is sent in. Therefore, the transistor Q3 cannot be rendered conductive. In addition, as the capacitor C10 cannot be discharged for the period of pause time of ringing (two seconds, in Japan), the input level of the inverter IC-57 is kept at HI, and accordingly the above-described monostable multivibrator IC-1 is kept inoperable. Accordingly, no matter how many times the bell rings thereafter, the flip-flop circuit is never reset, and therefore the displayed digits are maintained as they are.

Thereafter, while the called party, after picking up the handset, talks with the calling party, at least several seconds pass. During this period, the capacitor C10 is discharged, and therefore the input level of the inverter IC-57 is lowered to LO, and the monostable multivibrator IC-1 is brought to be in a set state and, upon completion of the talk, becomes ready for the next call. Upon arrival of the next call, a single pulse is produced by the monostable multivibrator IC-1 so as to clear all of the displayed digits.

In this example, when the second ringing is effected, the decimal counter IC-65 carries out its counting operation, and the level of its terminal B is changed to HI from LO. As a result, at the count two the decimal counter IC-65 is placed in an inhibit state through the inverter IC-61 and the AND gate IC-59. Thus, the device according to the invention is so designed that the displayed digits are not affected by noise transients or the like.

Furthermore, the terminal 2 of the NAND gate IC-62 is at LO because of the output of the inverter IC-54 while the bell is ringing, and the output of the NAND gate IC-62 is held at HI. Thus, the circuitry is so designed that erroneous operations (which may be caused when the output of the NOR circuit IC-67 is at HI) are prevented.

The line extended from the terminal B upward in the figure and connected to the LS terminal of the APCM is to form a start circuit employed for connecting an automatic telephone answering device TAD to the displaying device of the invention. This will be described later.

After confirming the telephone number of the calling party from the telephone number display on the display units, the called party may pick up the handset.

As soon as the handset is picked up, the contacts of switches HS1–HS4 are reversed. Therefore, a voltage across diode bridge D20–D23 is maintained low, and therefore charging the capacitor C12 through the inverter IC-66 and the NOR gate IC-67 is not carried out; that is, the capacitor C12, which has been discharged is still maintained discharged. Therefore, the output of the inverter IC-68 is HI, so the input of the monostable multivibrator IC-70 is maintained at HI. Therefore, in this case, the single pulse is not produced from IC-70.

Thereafter, the user completes the conversation with the calling party and put back the handset on the cradle of the telephone set. In this operation, the hook switches HS1–HS4 are restored, and the output of the inverter IC-66 is maintained at LO and the output of the inverter IC-68 is LO, and the R-S flip-flop is not affected. Accordingly, the display is continued as it is, because the state of the flip-flop IC-47 is maintained.

In this case, the user can reset the flip-flop circuit IC-47 by operating the manual switch SW-2 to clear the displayed digits, if necessary. This is a means necessary for the protection of privacy in these devices.

As was described above, the device according to the invention is so designed that when the handset is picked up, the connection of the switch HS4 is switched over to the capacitor C12 from the capacitor C13. The reason for this is to display the telephone number of a called party. More specifically, when the user dials the telephone number of the called party, the input level of the inverter IC-66 becomes HI and LO repeatedly by the dialing pulses, which is utilized to display the telephone number of the called party.

In this operation, as the dial pulses are generated manually, there is a necessary minimum pause longer than 600 msec which is about twenty times as long (by the international standard). As the input level of the inverter IC-68 should not become LO during the dial operation, the input of the inverter IC-68 is held by the capacitor C12 having a large capacitance at HI for the period. When the first dial pulse, or the first digit, is displayed on the display unit and it comes to the minimum pause, the capacitor C12 is discharged. As a result, the output of the inverter IC-68 is raised to HI from LO, the single pulse is produced by the monostable multivibrator IC-70, and the input terminals of the NOR gate IC-52 have LO and HI, respectively. Therefore, the output level of the NOR gate IC-52 is raised to HI, and HI of the terminals A and B of the shaft register IC-2 are shifted by the clock pulse. Furthermore, the dial pulse through the inverter IC-69 is counted by the decimal counter IC-9. Thus, the display is conducted in the same order as in the above-described case. This display can be cleared by operating the manual switch SW-2.

In the above description, the dialing system of the telephone set of the called party is a mechanical dialing system in which mechanical pulses are generated manually. However, it should be noted that the invention is applicable also to the push-button type dialing system which is extensively employed for telephone sets at present. As shown in FIG. 1(A), a circuit IC-100 is provided in the middle of the telephone lines L1 and L2 extended to the diode bridge (D20–D23). The circuit IC-100 is an IC for a push-button type telephone circuit such as for instance a part "KY5-9100" manufactured by the General Instrument Co. This circuit operates to convert signals transmitted by the push-button type telephone set of a called party into a series of mechanical dial pulses which are applied to the circuits connected to the circuit IC-100.

In the example, it is possible according to a well known technique to introduce the outputs of the decade counters IC-21 - IC-32 into a printer.

Now, the connection of an automatic telephone answering device to the displaying device of the invention will be described. In general, the automatic telephone answering device is connected directly to the telephone lines. However, the connection of the telephone answering device TAD to the displaying device is effected by connecting the device TAD to the telephone lines through the APCM unit which serves as an interface unit therebetween, and by connecting the start terminal LS of the APCM to the terminal B of the decade counter IC-65. In this case, after the telephone number display has been correctly carried out, that is, after the level of the terminal B is raised to the HI level, the automatic telephone answering device starts its operation and the loop circuit is formed by the APCM unit. This has two advantages: one is that the telephone numbers of calls received during the absence of the user can be printed out, as records, by the printer, and the other is that the messages from the calling parties can be recorded. Therefore, when the user returns, he can readily find who called him at a glance, and if he wants to have more information as to the calling parties, he can listen to the messages of the calling parties by reproducing the voices recorded on the tape.

In printing out characters with a printer, a printing ribbon impregnated with ink is struck by type bars. The ribbon is divided into the upper region and the lower region which are colored red and black respectively, and therefore the colors of characters to be printed out are selected by a relative shifting of the type bars and ribbon. The provision of a solenoid coil or an electromagnet is most suitable for electrically controlling the shifting. For instance, the selection of colors for characters may be achieved in such a manner that a character is printed out black when the electro-magnet is energized, and a character is printed out red when the electromagnet is not energized. More specifically, as shown in FIG. 1(A), another contact means of the hook switch is connected to the electric source +B and a solenoid coil SD, so that the plunger of the plunger coil is operated to shift the type bars, thereby to select the colors for characters to be printed out. A variety of mechanical means of this type are known in the art. For instance, a printing system called "Ink Jet" in which ink is jetted, is known in the art. In this system also, the selection of colors for characters to be printed out can be readily achieved by moving the shutter up and down by means of the aforementioned plunger.

In the above description, numerals 1-10 as telephone numbers, are displayed at intervals of minimum pauses. In this connection, the BCD 7 segment decoder/drivers (SN 7447) IC-33- IC-44 are so designed that in addition to digits 0-9 formed by 7 segments, five selected signs can be displayed. Therefore, if instead of the decimal counter IC-21 a 4-bit binary counter such as SN7493 is employed and 11 pulses are applied thereto, the selected sign " $\frac{1}{4}$ " can be displayed on the display unit DT-1. Therefore, if such a system is adopted when a calling party makes a call from a public telephone, the sign " $\frac{1}{4}$ " is displayed in place of the top or last numeral on the display unit DT-1, and the digits of the telephone number are successively displayed on the following display units DT-2, DT-3, and so forth. Thus, the called party can know if the call is from a public telephone. The rest of selected signs can be used as a substitution, for example, for shifting the ribbon color of the above-mentioned printer.

Furthermore, the invention contemplates that BCD codes, 2/5 (2 out of 5) codes, or other higher level codes can be employed instead of a train of simple series pulses. In such case, the display can be achieved with a hyphen (-) between a telephone exchange number or area code and a number handled by that office, and in addition it is also possible to display simple information by utilizing the pause period between rings. Especially in European countries where the interval between rings is relatively long (9 seconds in Sweden, and 5 seconds in Germany) it is possible to transmit more pieces of information during this interval. Such a method is an epoch-making one as a means for displaying information by telephone, and can be realized without departing from the spirit of this invention.

The particular example of the invention has been described with reference to the case where the telephone number information of a calling party is sent in between the ordinary calling signals, by the telephone exchange. However, in the telephone communication systems in some countries, the calling signal transmitting circuit and the telephone number information transmitting circuit belong to different systems. In addition, in the case where the telephone number of a calling party is transmitted after it has been confirmed whether or not the called party is a subscriber of the new service of this type or after the fee for it has been charged, it is more convenient that the transmission of the telephone number information described above is not limited to the period of time between the calling signals. In this case, a method for sending the telephone number information by superimposing it on the calling signal can be used. However, in order to practice this method, it is necessary to provide a very, intricate means for separating the telephone number information, which is of high frequency and at a very low potential, from the calling signal which is, in contrast, of low frequency and at a high potential. There is another method of sending the telephone number information immediately before transmitting the calling signal. That is, as in the ordinary telephone, a reverse signal is transmitted before sending the calling signal, and the device of the invention may be placed in "reset-set" state by using the reverse pulses as the start signal. Furthermore, it is possible that a signal replacing the reverse signal is employed, and during this period the transmission of the calling signal is suspended, so that the calling signal is transmitted after the telephone number information has been completely transmitted. In this case, in the input circuit in FIG. 1, the points a and b are connected through a capacitor Cx, and the inverter IC-53 is operated by the low level component in the reverse signal. In the manner described before, the reset pulse is applied to the flip-flop IC-47, as a result of which the display is cleared. Thereafter, the set pulse is provided by the action of the resistor R7 and the capacitor C10, and the device becomes ready for a new telephone number, it is displayed, and hereafter the bell of the telephone set rings. In this connection, it goes without saying that the cell CdS is removed so that the correctly displayed numerals may not be cleared even if the bell rings.

As is apparent from the above description, in the present invention, upon arrival of a calling signal, the calling party's telephone number is displayed at high speed (within one second) during the ringing of the bell. During this period it can be checked whether or not the information is correct. When the information has been found correct, the displayed numberals are not affected even if the bell rings. In contrast, when the information is erroneous, the display is cleared by the next ring. This is repeated until the correct information is obtained. Thus, after confirming this display, the called party can pick up the handset to talk with the called party.

Furthermore, the telephone numbers of calls received during the absence can be printed by the printer, or recorded by the telephone answering device.

It is also possible that when the user makes a telephone call by picking up the handset, or when a normal dialing operation is carried out by him, the telephone number dialed by him can be displayed by switching the concerned circuits (with a greater part of the displaying device maintained as it is).

Thus, the device of this invention is novel, and is outstanding in practical use.

What is claimed is:

1. A telephone set capable of receiving not only successive ringing signals from a telephone exchange but also, between successive ringing signals, a coded signal representative of the incoming telephone number of a calling party and capable of generating a coded signal representative of the outgoing telephone number of a called party (Subscriber-A) who is the operator of said telephone set, which telephone set comprises:
   a hook switch which is in a first position when the handset of said telephone set rests thereon (on-hook) and is in a second position when the handset is raised (off-hook);
   a display device for displaying incoming and outgoing telephone numbers, said display device comprising multiposition display means (IC-2-IC-3, C9-IC32, DT1-DT12) responsive to said coded signals, for displaying in positional order numerals represented by said coded signals;

pulse generating means operatively associated with said display means for generating a pulse in response to a minimum pause which is provided for applying each coded signal to said multiposition display means one digit by one digit in shifting function;

first circuit means (NL-CDS, LT, IRC, Q3) operatively connected to said display means and responding to ringing signals from a telephone exchange when said hook switch is in said first position, to apply a coded signal representative of the telephone number of said calling party to said multiposition display means;

second circuit means (IC-100, D20–D23) operatively connected to said display means for applying thereto a coded signal representative of the telephone number of a subscriber (Subscriber-B) which is dialed by a subscriber (Subscriber-A) who has picked up the handset of said telephone set, when said hook switch is in second position; and third circuit means (IC-1, IC47, IC-49, etc.) operatively connected to said display means for clearing said coded signal representative of the telephone number of said calling party or said subscriber (Subscriber-B) which has been displayed on said display means, when said telephone set receives a new ringing signal.

2. A telephone set as claimed in claim 1 comprising means for operating said second circuit means including a mechanical rotary dialer.

3. A telephone set as claimed in claim 1 comprising means for operating said second circuit means including a push-button type multi-frequency dialing system.

4. A telephone set as claimed in claim 1 which further comprises: parity check means for checking parity errors which may be caused after transmission of said coded signal; a telephone answering system; and starting means for starting said telephone answering system upon detection of a correct coded signal.

5. A telephone set as claimed in claim 1 which further comprises: parity check means for checking parity errors which may be caused after transmission of said coded signal; printer means; and means for starting said printer means when a correct coded signal is detected, to print out numerals displayed on said display means.

6. A telephone set as claimed in claim 5 in which said printer means can print in one of two colors, said printer means including means responsive to the state of said hook switch to select one of said two colors to be printed.

7. A display device for displaying a coded signal, comprising:

display means for displaying a telephone number represented by coded signals;

first circuit means operatively associated with said display means (NL, CDS, IC-53, IC-54, IC-1, IC-47, IC-49) for clearing a telephone number displayed on said display means, in response to the arrival of a calling signal or a pulse similar to said calling signal;

second circuit means operatively associated with said display means (LT, IRC, Q3) for receiving and shaping a coded signal representative of the telephone number of a calling party when the hand-set of a telephone set provided with said display device rests on the hook switch of said telephone set, and after checking whether or not said coded signal is correct, applying said coded signal to said display means;

third circuit means operatively associated with said display means (IC-100, D20–23, IC-66, etc.) for coding a telephone number (of Subscriber-B) which is dialed by a called party (Subscriber-A) into a coded signal, and applying said coded signal to said display means by switching said second circuit means in association with the hook switch of said telephone set; and means (IC-70) for generating a start pulse in response to a minimum pause which is provided for shifting said coded signal of said calling party or subscriber (Subscriber-B).

8. A display device as claimed in claim 7, in which even if, after said first circuit means has been operated by a reverse pulse provided before arrival of a ringing signal (calling signal), a coded signal representative of the telephone number of a calling party arrives before arrival of the calling signal, said coded signal is allowed to be displayed on said display means by said second circuit means.

9. A display device as claimed in claim 8, in which, irrespective of whether the telephone set of a called party (Subscriber-A) has a mechanical dialing system (D.P.) or a multi-frequency dialing system (MF), picking up the handset of said telephone set causes said second circuit means which has been placed in a standby state to display the telephone number of a calling party to be switched over to said third circuit means for displaying the telephone number of Subscriber-B dialed by Subscriber-A.

10. A display device as claimed in claim 7 comprising parity check means for checking said coded signal to check parity errors which may be caused after transmission of said coded signal, and when said coded signal is correct, to provide a detection signal (at the terminal B of IC-65) which is locked when said coded signal is correct, to allow an automatic telephone answering device to advise of the absence of a called party or to record a message from a calling party.

11. A display device as claimed in claim 10 in which said printer is provided with a selection circuit which is operated by separate drive circuits and further circuits related to said separate drive circuits, said selection circuit being operative to select, separately according to the state of the hook switch of said telephone set when said display device is in the standby state and when a user (Subscriber-A) picks up the handset of said telephone, one of a plurality of colored regions of a printing ribbon of said printer, thereby to print out in different colors the telephone number of a calling party and the telephone number of a subscriber (Subscriber-B) dialed by the user (Subscriber-A).

12. A display device as claimed in claim 7 comprising parity check means for checking said coded signal to check parity errors which may be caused after transmission of said coded signal as to whether or not said coded signal is correct, display of said correct coded signal is not distrubed by the following calling signal or the equivalent, and a locking circuit which is operated when the display of a correct coded signal is effected provides a detection signal (at the terminal B of IC-65) to permit a printer to print out said correct coded signal.

* * * * *